United States Patent
Sato

(10) Patent No.: US 11,042,380 B2
(45) Date of Patent: Jun. 22, 2021

(54) APPARATUS, METHOD AND COMPUTER PROGRAM FOR PROCESSING INSTRUCTION

(75) Inventor: Yasushi Sato, Hamamatsu (JP)

(73) Assignee: KAWAI MUSICAL INSTRUMENTS MFG. CO., LTD., Hamamatsu (JP)

(*) Notice: Subject to any disclaimer, the term of this patent is extended or adjusted under 35 U.S.C. 154(b) by 1286 days.

(21) Appl. No.: 12/379,800

(22) Filed: Mar. 2, 2009

(65) Prior Publication Data

US 2009/0249043 A1   Oct. 1, 2009

(30) Foreign Application Priority Data

Mar. 25, 2008   (JP) ................................ JP2008-77138

(51) Int. Cl.
*G06F 9/30* (2018.01)
*G06F 9/38* (2018.01)

(52) U.S. Cl.
CPC .................................. *G06F 9/3836* (2013.01)

(58) Field of Classification Search
None
See application file for complete search history.

(56) References Cited

U.S. PATENT DOCUMENTS

| | | | | |
|---|---|---|---|---|
| 5,504,923 A | * | 4/1996 | Ando | ............................ 712/23 |
| 6,842,124 B2 | * | 1/2005 | Penna | ............................ 341/67 |
| 7,502,912 B2 | * | 3/2009 | Sodani et al. | ................ 712/214 |
| 2003/0088759 A1 | * | 5/2003 | Wilkerson | ..................... 712/218 |

FOREIGN PATENT DOCUMENTS

| | | |
|---|---|---|
| JP | A-11-134128 | 5/1999 |
| JP | A-2001-100807 | 4/2001 |
| JP | B2-3419563 | 6/2003 |
| JP | B2-3436806 | 8/2003 |
| JP | B2-3530600 | 5/2004 |
| JP | B2-3530601 | 5/2004 |
| JP | B2-3633963 | 3/2005 |

* cited by examiner

*Primary Examiner* — Corey S Faherty
(74) *Attorney, Agent, or Firm* — Oliff PLC

(57) ABSTRACT

A plurality of instructions to be executed in an order of being issued without an appointment of a waiting time or a starting moment are designed to be executed after a certain waiting time; instructions to be executed in an order of being issued without designation of starting moment or waiting time are provided with starting moment or waiting time information so that the instructions can be executed in an order designated by the time information.

21 Claims, 11 Drawing Sheets

| word/column | 1 | 2 | 3 | 4 | ... |
|---|---|---|---|---|---|
| 1 | instruction content | instruction content | instruction content | instruction content | ... |
| 2 | instruction argument | instruction argument | instruction argument | instruction argument | ... |
| 3 | issue time | issue time | issue time | issue time | ... |
| 4 | time informaiton | time informaiton | time informaiton | time informaiton | ... |
| 5 6 | address of the next column | address of the next column | address of the next column | address of the next column | ... | included in the program/data storage 4

FIG. 2

APPARATUS, METHOD AND COMPUTER PROGRAM FOR PROCESSING INSTRUCTION

BACKGROUND OF THE INVENTION

1. Field of the Invention

The present invention relates to an apparatus, method and computer program for processing instruction, and more particularly, to the apparatus, the method and computer program for processing instructions efficiently to prevent a wasteful time while processing.

2. Description of Related Art

Conventionally there has been a time appointment method which instructs to start processing after an appointed waiting time or at an appointed starting moment and an order designation method which designates an order to execute an instruction but not a moment to start the execution. For instance, MIDI (musical instruments digital interface) data is transferred between electronic musical instruments of MIDI standard by the order designation method which does not appoint a moment to execute an instruction.

By the time appointment method which appoints a waiting time or a starting moment as mentioned above, instructions including the starting moment or waiting time information are stored at a memory such as a mail box. A CPU/controller at a receiver's side reads the instructions in the mail box one by one. When the appointed starting moment corresponds with the actual present time or the appointed waiting time has passed, the execution of the instruction is started.

By the order designation method, instructions are stored/written at a memory/waiting line in an order of execution. A CPU/controller at a receiver's side reads and executes the instructions in the memory/waiting line according to the order. The order designation method does not include the information of the appointed starting moment or waiting time.

3. Related Works (1) Japanese Patent Publication No. 11-134128

However, some instructions include designation of a starting moment or a waiting time. The aforesaid methods to appoint a waiting time or a starting moment determine the order of execution solely by the appointment. Therefore if there are plural instructions which appoint the same starting moment or the same waiting time, the order of executing such instructions are made uncertain. It has been necessary to compare all the appointed starting moments or waiting times of all the instructions, and time has been wasted until the present actual time reaches the appointed starting moment or the appointed waiting time has passed. On the other hand, the order designation method, which is not originally designed to include time information, has not been able to appoint a starting moment or a waiting time of an instruction.

SUMMARY OF THE INVENTION

In order to achieve the above-mentioned purpose, the present invention provides time information to an instruction execution system which processes instructions in an order of being issued. The time information is provided when an instruction appoints its starting moment or waiting time and designates the following instruction to be executed right after. The time information provides the instruction to be executed formerly with an appropriate waiting time or starting moment and provides the following instruction with a waiting time or starting moment to make the waiting time shortest.

Accordingly an instruction including a waiting time or a starting moment is executed after the correct appointed waiting time or at the correct appointed starting moment. And the following instructions which do not include a waiting time or a starting moment are arranged to be executed in a correct order.

Upon switching the effect modes, a certain period of time must be waited to pass after performing a fade-out before switching the modes and transferring a parameter. Otherwise some noise tends to occur or tones may sound odd. No noise occurs if the parameter is transferred just after switching the modes, but the order of switching the modes and transferring the parameter must not be reversed. The modes refer to the sorts of the effects.

In the mail box method, time data are compared after all mails have been scanned. However it is impossible to judge the orders of issue/priority/execution of the instructions having the same time data. In FIFO (first in first out) method, the orders cannot be mistaken and there is no need to scan all the instructions. However it is difficult to realize the appointed waiting time.

Because the present invention adds an issue time and a waiting time or starting moment data to a FIFO method instruction, adds a waiting time for sound extinction to the mode switching, and adds the shortest waiting time to the parameter transfer, the order of execution cannot be mistaken, and switching the modes and transferring the parameter can be executed while realizing the appointed waiting time.

The aforesaid waiting time information refers to the time interval from the issue time to the starting moment of an instruction. The aforesaid starting moment information refers to the moment to start executing the instruction. The apparent starting moment of the instruction to be executed right after the preceding instruction given a waiting time or starting moment information becomes earlier than the starting moment of the preceding instruction. Actually, however, the instruction to be executed right after the instruction given a waiting time or starting moment information is executed afterward.

BRIEF DESCRIPTION OF THE DRAWINGS

FIG. 2 shows a program stored at the program/data storage 4.

DESCRIPTION OF THE PREFERRED EMBODIMENT

(1) Summary of the Preferred Embodiment

When an event takes place (step 80), the information at the head of the programs in the program data storage 4 is read including a content, an instruction argument and a waiting time of the instruction (step 71). The waiting time information is stored at the timer 16 (step 72). When the waiting time has passed (step 81), the parameter of the instruction argument is sent to the tone signal generator 5 (step 75). When a timer interrupt signal TIN is sent (step 79), the instruction in response to the waiting time information is ended (step 80), and the next instruction starts to be executed (steps 73 to 78). For instance the mute process is finished and then the vibrato process is started, or finished. In this way instructions given a waiting time information are executed one after another as time passes according to the waiting time information.

(2) The Entire Circuit

Figure 1:
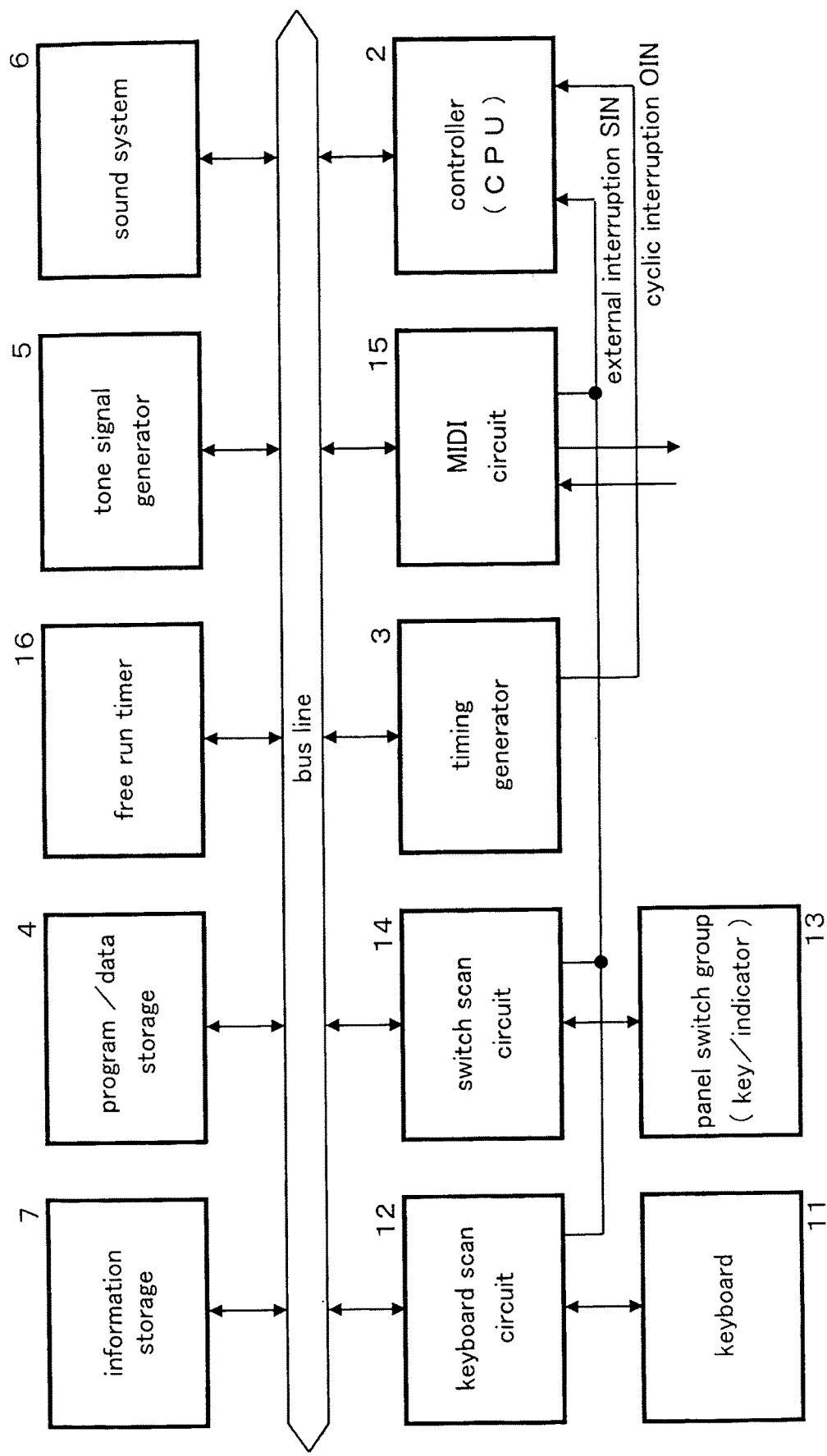
FIG. 1 shows the entire circuit 1 of the apparatus for processing instruction or an electronic musical instrument.

FIG. 1 shows an entire circuit to realize the method for processing instruction (instruction processing method), an entire circuit to execute a computer program for the method for processing instruction (instruction processing method) and an entire circuit 1 of the apparatus for processing instruction (instruction processing apparatus) or an electronic musical instrument.

Each key of the keyboard 11 instructs tone generation and extinction. The instructions are scanned by the key scan circuit 12 to detect data showing key-on or key-off. The data are compared with the data showing the each key's on or off state detected at the previous scanning so as to find out if the each key's on or off event has occurred. When the event occurs, the external interrupt signal OIN is sent from the key scan circuit to the controller 2.

Each key of the keyboard 11 is disposed with a steps switch serving as a speed sensor, an acceleration sensor and a pressure sensor. The aforesaid scanning is performed at every operation of the each steps switch. At the first switch-on/off among the steps of the each steps switch, the on/off event is individually detected. The sensors of the steps switch provide the touch information showing the speed and strength of the touch, that is, the initial touch data and the after touch data. Electronic string instruments, electronic wind instruments, electronic percussion instruments (pads, etc.) or a keyboard of a computer may be used in place of the keyboard 11.

All the switches in the panel switch group 13 are scanned by the switch scan circuit 14. This scanning detects data showing the each switch's on or off. The detected data is compared with the data showing the each switch's on or off state detected at the previous scanning so as to find out if the each key's on or off event has occurred. When the event occurs, the external interrupt signal OIN is sent from the key scan circuit to the controller 2.

The MIDI circuit 15 is an interface for sending and receiving performance information and tone waveform signals to and from an externally connected electronic musical instrument. The performance information is in accordance with the MIDI (musical instrument digital interface) standard. Sounds are generated based on this performance information as well.

When information is sent to the MIDI circuit 15 from outside, the external interrupt signal OIN is sent from the MIDI circuit 15 to the controller 2. The external interrupt signal OIN is sent from an external device connected to the instruction processing apparatus as well as from the key scan circuit, the switch scan circuit or the MIDI circuit 15.

The keyboard 11, the panel switch group 13 or the MIDI circuit 15 includes automatic performance equipment. Performance information (tone generation information) provided from the keyboard 11, the panel switch group 13, the MIDI circuit 15 and the automatic performance equipment is information for the purpose of generating tones.

The performance information (the tone generation information) is musical factor information such as pitch (tone pitch range) information (a factor to determine a pitch), sounding time information, performance field information, information on the number of sounding tones and information on a degree of resonance, etc. The sounding time information shows the time passed from the start of sounding. The information on performance fields shows performance parts, tone parts and musical instrument parts responsive to a melody accompaniment, chord, bass, rhythm and MIDI, or to an upper keyboard, a lower keyboard, a foot keyboard, a solo keyboard and MIDI, etc.

The pitch information is captured as key number data KN. The key number data KN consists of octave data (tone pitch range data) and pitch name data. The performance field information is captured as part number data PN. The part number data PN identifies performance areas and is set according to the performance area the generated tones come from.

The sounding time information is captured as tone time data TM, which is based on time count data from a key-on event or an envelope phase is utilized as a substitute. The sounding time information is detailed as information on time passed from the start of sounding in the specification and the drawings of Japanese Patent Application No. 6-219324.

The information on the number of sounding tones shows the number of tones sounding simultaneously. For instance, the number is in accordance with the number of tones of the on/off data "1" of the assignment memory 40. The number is determined as shown in the flowcharts of Figs. 9 and 15 of Japanese Patent Application No. 6-242878, Figs. 8 and 18 of Japanese Patent Application No. 6-276855, Figs. 9 and 20 of Japanese Patent Application No. 6-276857 and Figs. 9 and 21 of Japanese Patent Application No. 6-276858.

Various switches are disposed in the panel switch group 13. The switches includes timber tablets, effect switches, rhythm switches, pedals, wheels, levers, dials, handles and touch switches, all for musical instruments. The pedals include damper pedals, sustain pedals, mute pedals and soft pedals. Effect mode switches and effect parameter switches are disposed in the panel switch group 13 for setting/switching of the effect modes and setting of the effect parameter.

Tone control information is provided by way of the various switches. The tone control information works to control generated tones and is musical factor information including timbre information (timbre determinant), touch information (speed/strength of sounding instruction operation), information on the number of sounding tones, the degree of resonance, effect, rhythm, sound image (stereo), quantize, modulation, tempo, volume and envelope. The musical factor information is incorporated into the performance information (tone information) and is fed by way of the various switches, incorporated into the automatic performance information or incorporated into the performance information sent and received by the aforesaid interface.

The timbre information covers various kinds of musical instruments (sounding media/sounding means) such as keyboard instruments (piano, etc.), wind instruments (flute, etc.), string instruments (violin, etc.) and percussion instruments (drums, etc.) and is taken as tone number data TN. The envelope information includes envelope level EL, envelope time ET and envelope phase EF.

The musical factor information is sent to the controller 2, where various signals later mentioned, data and parameter are exchanged, and contents of tones are determined. The performance information (tone generation information) and the tone control information are processed by the controller 2, data are sent to the tone signal generator 5, and tone waveform signal MW is generated. The controller 2 includes CPU, and in some cases also includes DSP (digital signal processor), ROM and/or RAM. The controller 2 may be disposed at every circuit shown in FIG. 1.

Tone waveform signals are stored at the program/data storage 4 in which the tone waveform signals sent from the MIDI circuit 15 are sometimes written. The tone waveform signals in the program/data storage 4 are copied to the information storage 7 directly or through a bus line, incorporated in other devices and transmitted to the tone signal generator 5.

The program/data storage 4 (internal storage medium/means) consists of storage devices such as ROM or RAM capable of writing, flash memory or EEPROM. Computer programs stored at the removable information storage 7 (external storage medium/means) such as an optical disk or a magnetic disk are transcribed and stored (installed/transferred) at the program/data storage 4.

Also stored (installed/transferred) at the program/data storage 4 are programs transmitted from an external electronic musical instrument or a computer through the MIDI circuit 15 or a transmitter-receiver. The storage medium of this program includes a communication medium.

This installation (transfer/copy) is automatically executed when the information storage 7 is set at the tone generation apparatus or when the power is applied to the tone generation apparatus as well as by a manual operation. The aforesaid program corresponds to the flowcharts presented later for the controller 2 to perform various processing.

The tone generation apparatus may originally store other operating systems and programs, with which the aforesaid program may be executed together, so long as the processes and functions described in the claims can be executed by the aforesaid program alone or with other programs when this program is installed to the tone generation apparatus (the main computer) and executed. Such operating systems are shown in the flowcharts presented later, however, they may not be necessarily provided to the tone generation apparatus.

A part of or the whole program may be stored and executed at another or more other equipments besides the tone generation apparatus. Data/programs which are going to be or have been processed may be transmitted and received through a communication means between the tone generation apparatus and the other equipment, so that the tone generation apparatus together with other equipments can perform the present invention as a whole.

The program/data storage 4 stores the musical factor information and the various data previously mentioned and more other data including data necessary for the time-sharing processes and for assignment to a time-sharing channel.

The tone signal generator 5 first stores the tone waveform signals, read them at a speed responsive to the designated pitch and synthesizes envelope waveform signals so as to output and generate tones from the sound system 6. The tone signal generator is supplied with DSP (a digital signal processor). DSP performs processing corresponding to the aforesaid effects so as to output and generate tones added with the effects accordingly.

The waveforms of the tone waveform signals are switched and changed according to the aforesaid information on timbre, touch, pitch, tone pitch range, sounding time, performance field, the number of sounding tones and the degree of resonance, etc. The tone waveform signals maybe stored at the tone signal generator 5 in the compressed storage form before decompression and regeneration and may be decompressed and regenerated at the tone signal generator 5.

The timing generator 3 supplies timing control signals to each of the circuits in order to synchronize all the circuits of the tone generation apparatus. The timing control signals may or may not include a clock signal of a clock signal of each cycle, a signal derived from a logical product or a logical sum of the clock signals, a signal having a cycle of a channel sharing time of the time sharing process, channel number data CHNo, and time count data TI.

The timing generator 3 sends a cyclic interrupt signal SIN to the controller 2 at a fixed cycle, for example, at a cycle of every 200 micro seconds. Time count data TI shows an absolute time, that is, passage of time. The cycle from an overflow reset to the next overflow reset of the time count data TI is set to be longer than the longest sounding time of all the tones or than the longest job (operation) or event processing time, sometimes several times longer. The time count data TI is not always necessary.

A plurality of jobs (operations) are carried out simultaneously in the tone generation apparatus. Upon generation of the cyclic interrupt signal SIN, the aforesaid operating system shifts the control from the jobs being executed to other jobs. The cycle of the cyclic interrupt signal SIN is set not too short to make the shifting so frequent to be a burden itself, and not too long to bring about a delay in the response of the tone generation apparatus, that is, for instance 200 micro seconds.

The timer 16 is a free run type. The cycle from an overflow reset to the next overflow reset of the timer 16 is set longer than the longest job processing time, sometimes longer than the longest job or the longest event processing, or sometimes several times longer. The timer 16 is set to count a time interval short enough, that is, for instance 100 microseconds, to produce resolution precise enough to arise no errors that would matter.

The values of the timer 16 are stored at the instruction queue mentioned later as a waiting time or a starting moment until the execution of the instruction or may be used for other purposes relating to time. One or more pieces of time information may be stored at the timer 16 according to a waiting time until the execution of the instruction, and may be incremented or decremented at a certain cycle of time, for instance, at every 10 micro seconds. Each time a waiting time has passed according to the time information, the time interrupt signal TIN may be sent to the controller (CPU) 2 or other circuits to recognize the waiting time has passed according to the time information.

When the waiting time is stored at the instruction queue, the present time is stored as an instruction issue time and a certain time is stored as a waiting time. On the other hand when a starting moment is stored at the instruction queue, the present time is stored as an instruction issue time and a value as a result of adding a certain time to the present time is stored as a starting moment. When the time has come to process the instruction after some time has passed for performing other processes, the value of the present time is made advanced from the instruction issue time by the circuit.

When the waiting time is stored at the instruction queue, the starting moment of an instruction is determined by adding the waiting time to the instruction issue time stored at the queue. It is judged whether the waiting time has passed by comparing the result of the addition and the advanced present time as mentioned above. Similarly when the starting moment is stored at the instruction queue, it is judged whether the starting moment has come by comparing the starting moment stored at the queue and the advanced present time.

(3) Program/Data Storage 4

FIG. 2 shows a structure of the instruction queue (operation queue) stored in the program/data storage 4. The instruction queue consists of plural columns, that is, a unit of consecutive memory areas, six word consecutive memory areas as described in the preferred embodiment. Each column is separately positioned in blank areas of RAM in the program/data storage 4 but is able to be read out in a proper order since the addresses of the first and the last columns are stored and the address of each column is stored at the column right ahead. When one column is read out, the stored address of the first column is rewritten to the address of the column which the readout column has stored as the following column, that is, the address of the second column at the start of the readout. Thus the area the readout column has occupied is able to become blank.

When a new column is added, firstly the last column is discovered by its address that has been stored, and an instruction of the new column is stored at the next address this column has stored. Then the address of the last column that has been stored is rewritten to the address of the column that newly sets the instruction.

Lastly, consecutive memory areas just the size of the aforesaid column are searched in RAM and the first address is stored as "the address of the following column" of the new column. The instructions stored at each of the columns are transferred as a communication-between-jobs from the jobs shown in FIGS. 8 and 9 to a job shown in FIG. 10.

The individual instruction stored at the individual column includes a waiting time until the execution or the starting moment of the instruction. The instructions, transferred by a communication-between-jobs from the jobs shown in FIG. 8/FIG. 9 to the job shown in FIG. 10, may be utilized for other communications-between-jobs, for instance, FIGS. 8 and 11, eliminating the waiting time/starting moment information.

When instructions are given through the MIDI circuit 15 or the switch scan circuit 14 for the DSP of the tone signal generator 5 to switch the effect modes, stored in the consecutive columns of the instruction queue are the effect mode switching instruction with the adequately set waiting time or starting moment and the effect parameter setting instruction with the shortest waiting time or with the starting moment set approximately before the effect mode switching instruction.

Figure 11:
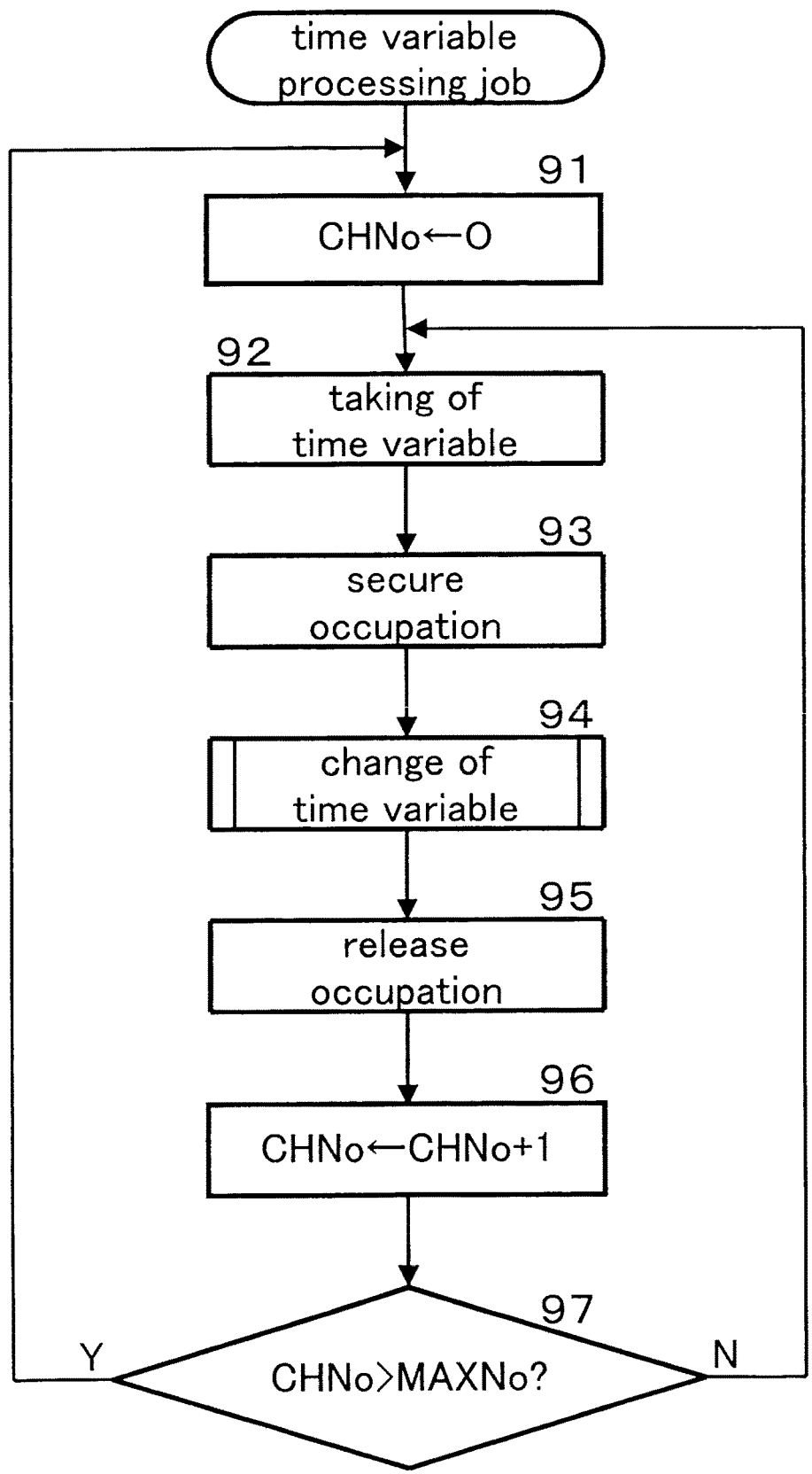
FIG. 11 shows a flowchart of the time variable job.

When the MIDI circuit 15, the keyboard scan circuit 12 or the switch scan circuit 14 gives instructions except switching the effect modes and/or setting the parameter of the effects and the instructions are to press or release keys, to change timbres and change controls for example, the instructions maybe transferred to, for instance, the job shown in FIG. 11 eliminating the waiting time/starting moment information and utilizing the aforesaid instruction queue, because it has been recognized that these instructions will be responded immediately.

The column to store one instruction stores plural data/information at consecutive addresses. The instructions stored at the column consist of the instruction's content, argument, issue time, time information and the address of the next column. The content of the instruction shows what is instructed by the aforesaid DSP. The content consists of two bytes. The upper byte indicates the instruction type, that is, the effect mode switching type or the effect parameter setting type. The lower byte indicates part numbers the effect are switched or set for.

The instruction argument consists of two words. The upper byte indicates the first parameter value and the lower byte indicates the second parameter value. When the instruction type is the effect mode switching type, the instruction argument shows the mode number. The effect mode means a sort of the effects such as reverb, echo and equalization.

When the instruction type is the effect parameter switching type, the instruction argument shows the parameter value at the each effect mode. For instance, when the effect mode is reverb, the effect parameter shows the initial rebounding time and the subsequent persistence time of sound, etc. When the effect mode is echo, the effect parameter shows a delay time and a repeat rate, etc. When the effect mode is equalization, the effect parameter shows a hi-band gain and a low-band gain. These instruction arguments consist of two bytes. The upper byte indicates the first parameter value, and the lower byte indicates the second parameter value.

The issue time is the time when the instruction is issued and it is set at the present time shown by the timer 16. When the effect mode switching instruction and the following effect parameter setting instruction are issued, the issue time is read from the timer 16 by the controller 2 and written in the instruction queue. The address of the next column shows the address of the column storing the instruction to be executed right after this instruction.

The time information shows the waiting time from the issue of the effect mode switching instruction to its execution and the waiting time from the issue of the effect parameter setting instruction to its execution.

The time information of the effect mode switching instruction shows the appropriate waiting time, while the waiting time of the effect parameter setting instruction shows the shortest waiting time. Therefore it appears as if the effect modes are switched after the effect parameter has been set. But the effect parameter setting instructions are always executed after the effect mode switching instructions have been executed, so that such a reverse of the order cannot occur.

This time information may indicate the time to execute the effect mode switching instruction and the effect parameter setting information. In such a case the instruction issue time is read from the timer 16 and added with a waiting time necessary for the effect mode switching instruction to be stored as the time information.

For the time information of the effect parameter setting instruction, the value before this time information is set. So it appears as if the effect modes are switched after the effect parameter has been set. But the effect parameter setting instructions are always executed after the effect mode switching instructions have been executed, so that such a reverse of the order cannot occur.

As mentioned above, in response to the effect mode switching event produced at the MIDI circuit 15 or the switch scan circuit 14, the effect mode switching instruction and the effect parameter setting instruction given an appropriate waiting time or starting moment are written in the instruction queue shown in FIG. 2.

When the time information indicates the waiting time, the result of adding the issue time to the time information is compared with the present time being counted by the timer 16 to recognize the execution time has come. Or it may also be recognized that the execution time has come when the time information becomes negative as a result of being decremented at every increment of the timer 16 while it is stored at the queue. The timer interrupt signal TIN may be used for this decrement.

When the time information indicates the starting moment, the time information is compared with the present time being counted by the timer 16 to recognize the starting moment has come. Or it may also be recognized that the starting moment has come when the time information shows the time before the issue time as a result of being decremented at every increment of the timer 16 while it is stored at the queue. The timer interrupt signal TIN may be used for this decrement.

The columns storing each instruction may be disposed at optional positions in RAM of the program/data storage 4 whether the time information indicates the waiting time or the starting moment. In either case, the columns are always written at the first and the last addresses stored as above mentioned and the next address stored in each column and are read out and executed in the order of being issued.

When the time information for the instruction of switching the effect modes indicates the waiting time data, the time information is set to provide a sufficient time for the sounding tones to be fade out by DSP and for noise to die away after switching the modes, that is, for instance 100 micro seconds. When it indicates the execution moment data, the time information is set at the value adding 100 micro seconds to the present time.

The time information for instructions of setting the effect parameter is set at as smallest a value as possible when it indicates the waiting time data. The smallest value may be "0", for instance. If "0" has already been used for another purpose, "1" may be used. When the time information indicates the starting moment data, it is set at a value between the present time and the starting moment data of the effect mode switching instruction prior to the present time or at a value before or after the value.

Program/data storage 4 also stores programs necessary for the present invention, data to execute the programs and temporary storage areas for the programs to store the values temporarily.

(4) The Overall Processing

Figure 3:
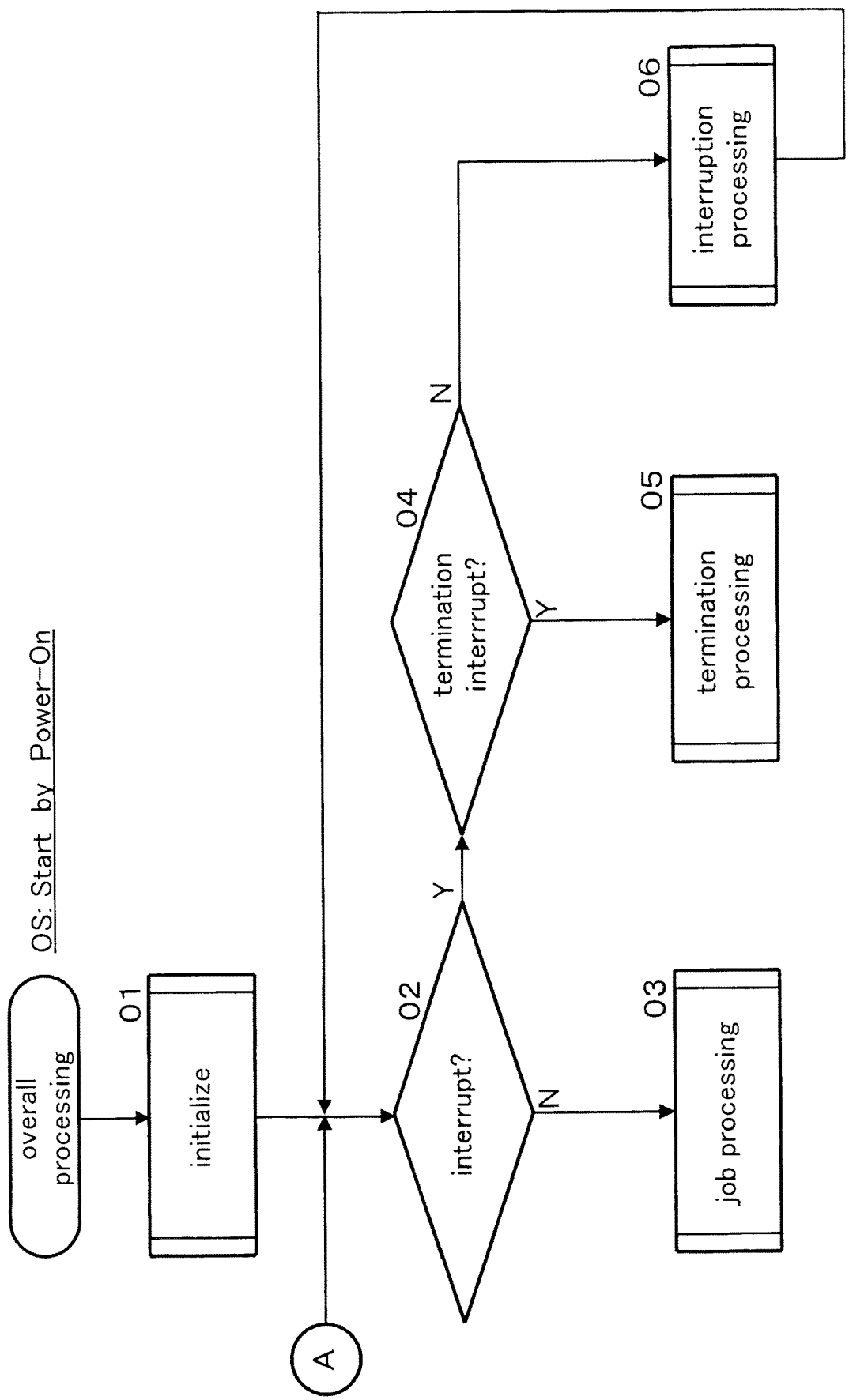
FIG. 3 shows a flowchart of the overall processing.

FIG. 3 shows a flowchart of the overall processing performed by the controller (CPU) 2. The overall processing is started by the power-on of the instruction processing apparatus, and some of the processes performed from the step 02 to the step 06 are repeated until the power-off. Firstly initializing processes are executed such as initialization of the program/data storage 4 (step 01).

The initialization processes include writing of the initial data, the mode data or the musical factor data (timbre, touch, pitch, sounding time) necessary to execute/process the aforesaid program into the program/data storage 4, the aforesaid RAM in the controller 2, the tone signal generator 5 or the sound system 6, and include starting/setting up of the each job processing mentioned later.

Then if the interruption event EV which will occur by the external interruption is not taking place (step 02), the processing gets started to initiate one of the jobs mentioned later (step 03). If the interruption event EV which will occur by the external interruption is taking place and the interruption event EV is caused by pressing the power button (step 04), the termination processing is performed as described later (step 05).

If the interruption event EV at the step 04 is not caused by pressing the power button, the interruption processing (step 06) is performed (step 06). Responsive to a specific interruption (press or release of keys, timbre control or tone generation control, etc.) caused in the interruption processing, the job to process the specific interruption (described later) is given the highest priority on all the other jobs, and the interruption event EV is cleared.

Then the control is moved to the location (A). As the interruption event EV has been cleared, the job processing (step 03) is selected at the step 02. The highest priority is given to the job dealing with the aforesaid interruption at the step 03, the job is executed at the step 03.

(5) Cyclic Interruption Routine/Processing

Figure 4:
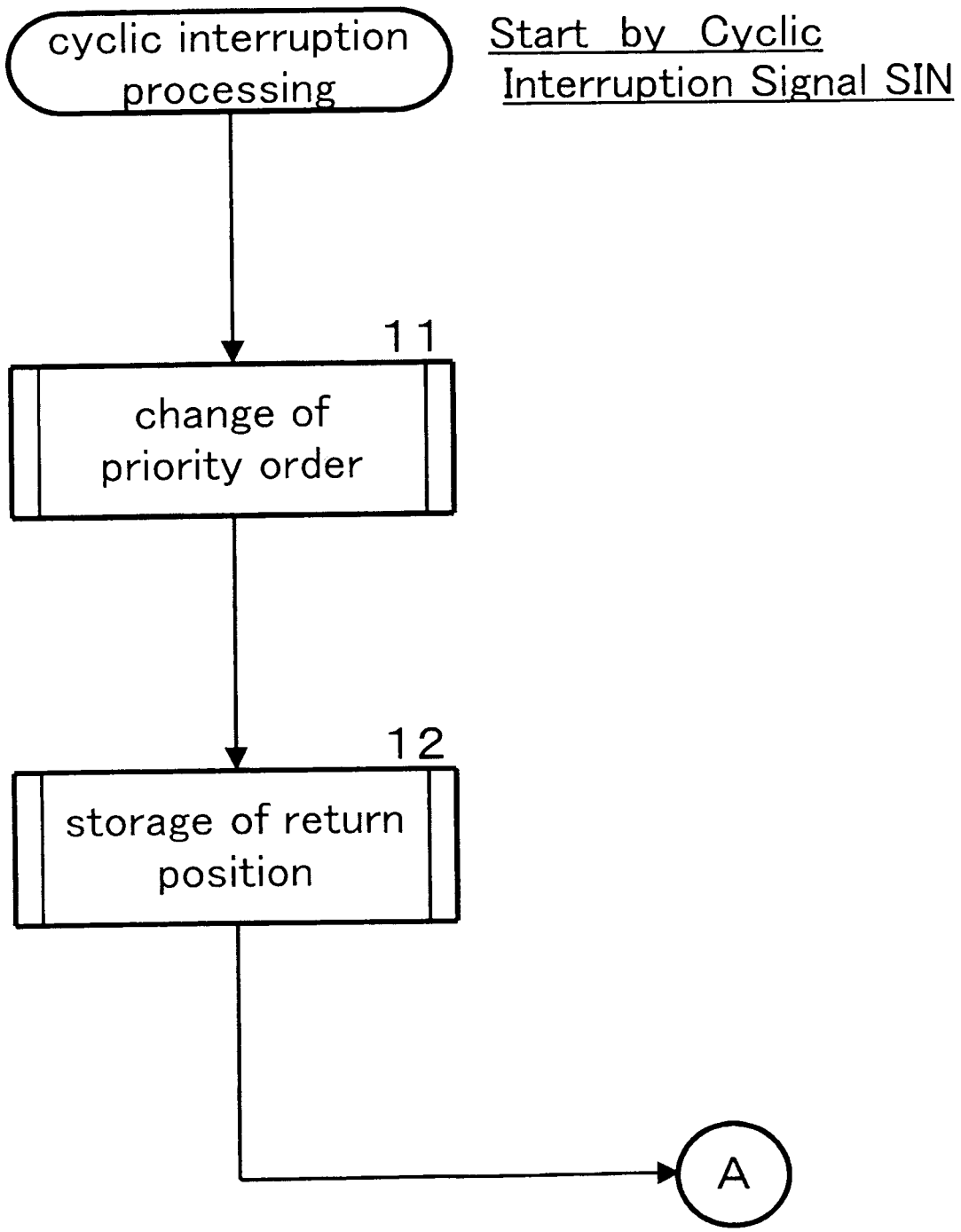
FIG. 4 shows a flowchart of the timer interruption processing.

FIG. 4 shows a flowchart of the cyclic interruption routine/processing. Every time the cyclic interrupt signal SIN is sent from the timing generator 3 to the controller 2, this routine/processing is executed. The first step is to change (modify) the priority order (step 12), and the next is to store the return position (step 12) which is the position (A) to be processed between the step 01 and the step 02.

At the process to change the priority order (step 11), the priority level of the processing which has just been carried out by the controller 2 until then is lowered and the priority level of other jobs (operations) mentioned later which are not in the sleeping state is raised (higher). Jobs (operations) which are in the sleeping state are not raised (higher). At the process to store the return position (step 12), the position of the process which has been carried out until the start of the cyclic interruption routine/processing is stored at RAM.

( 6) The External Interruption Routine/Processing

Figure 5:
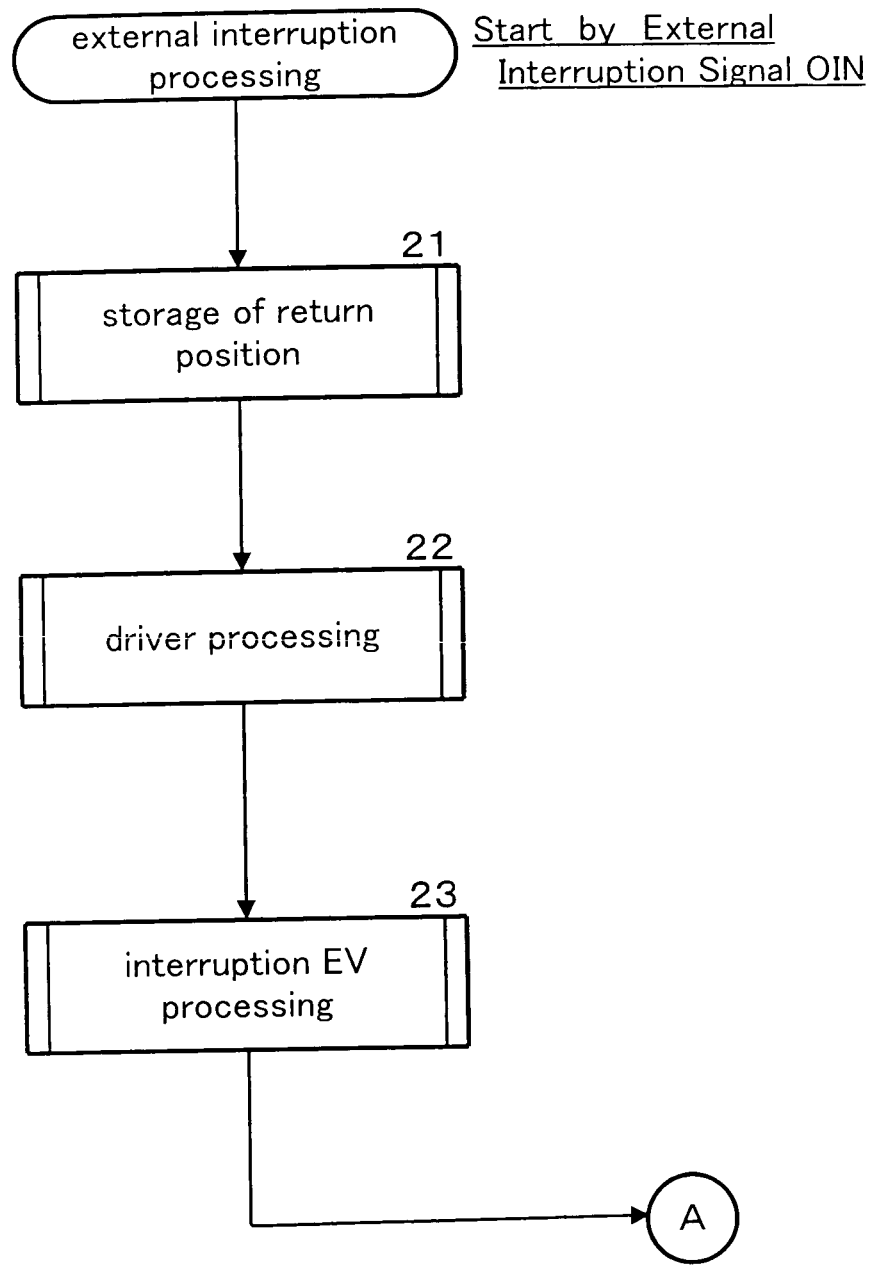
FIG. 5 shoes a flowchart of the external interruption processing.

FIG. 5 shows a flowchart of the external interruption routine/processing performed by the controller (CPU) 2. This routine/processing is carried out every time the external connect apparatus such as the MIDI circuit 15 sends the external interrupt signal OIN to the controller 2. The first process is to store the return address (step 21).

The next step is the driver process to capture information sent from outside (step 22). At the interruption event EV processing if the captured information is a complete series of instructions, the interruption event EV occurs (step 23) and the process returns to the position (A) between the step 01 and the step 02.

This process to store the return address (step 21) is the same activity as the step 12. At the step 22, a series of or a single piece of information is sometimes captured in the form of a certain amount of divided pieces of, for instance, divided into one byte. Taking the MIDI data for example, a command in several bytes is divided and transmitted in one byte at a time.

(7) Job Processing (Step 03)

Figure 6:
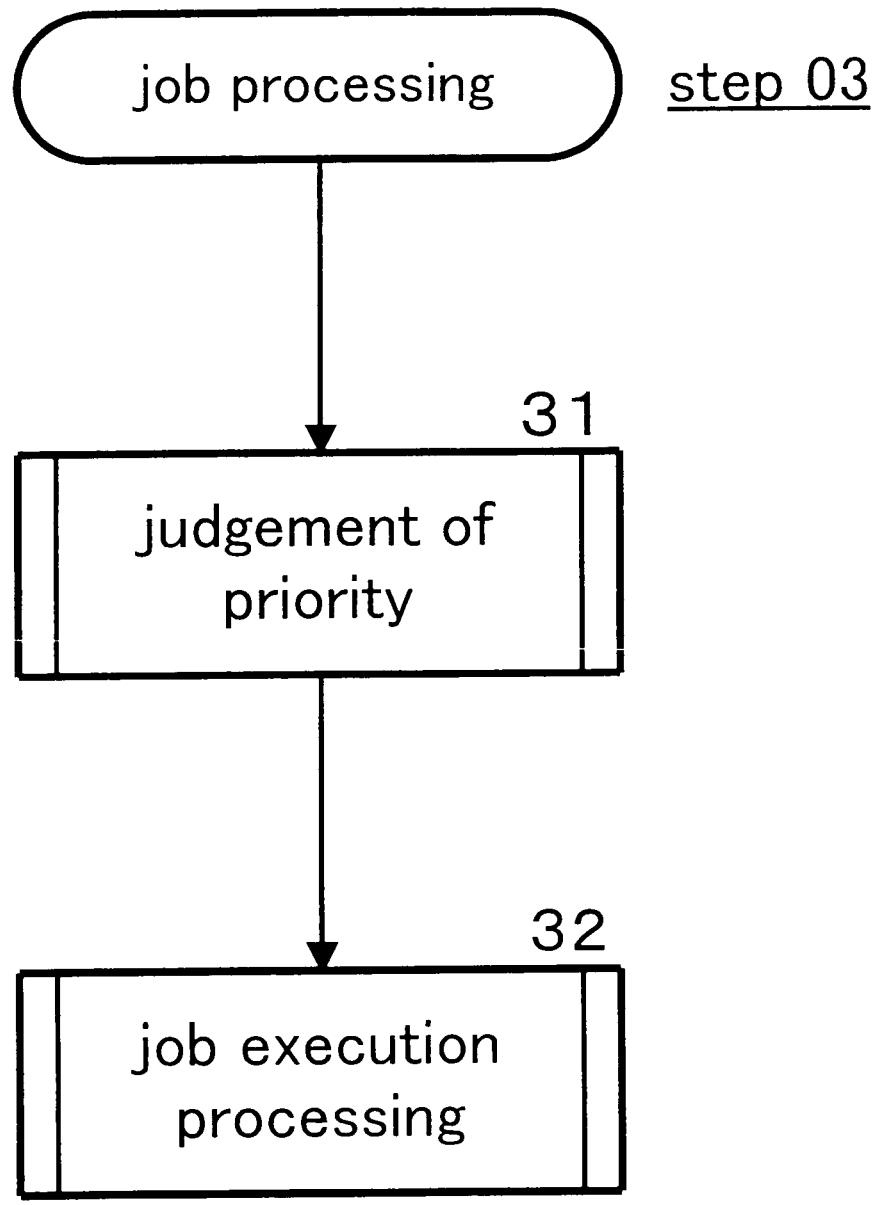
FIG. 6 shows a flowchart of the job processing at step 03.

FIG. 6 shows a job processing at the step 03. The first process is to judge the priority levels of plural jobs mentioned later (step 31) so as to execute the highest priority job (step 32). The priority levels have been set/changed at the steps 06 and 11. At the step 32 one of the jobs mentioned later is resumed from the step following the last step to which the job has proceeded. However if the job is in the sleeping state mentioned later, it is resumed from the beginning exceptionally.

Each of the jobs executes a tone control processing such as changing of tone numbers and setting or changing of musical effects like vibrato, musical information (transpose, tune, etc,), tone information (the content by percentage of harmonics, cutoff frequency on/at the filter), touch information (velocity sensitivity, offset, etc.), envelope information (attack, decay, release, etc.) as well as switching of the effect modes and setting of the effect parameter as mentioned above.

This job processing executes some of the aforesaid plural jobs. While each job is carried out, the timer interruption and the external interruption are permitted. These interruptions call the cyclic or external interruption routine/process. After the routine/process is executed, it is returned to the position (A) shown in FIG. 3 not to the position next to where the interruption occurred. The position next to where the interruption occurred is preserved in each interruption routine. When said job is executed again according to this job processing routine, it is resumed from the preserved position.

(8) Termination Processing (Step 05)

Figure 7:
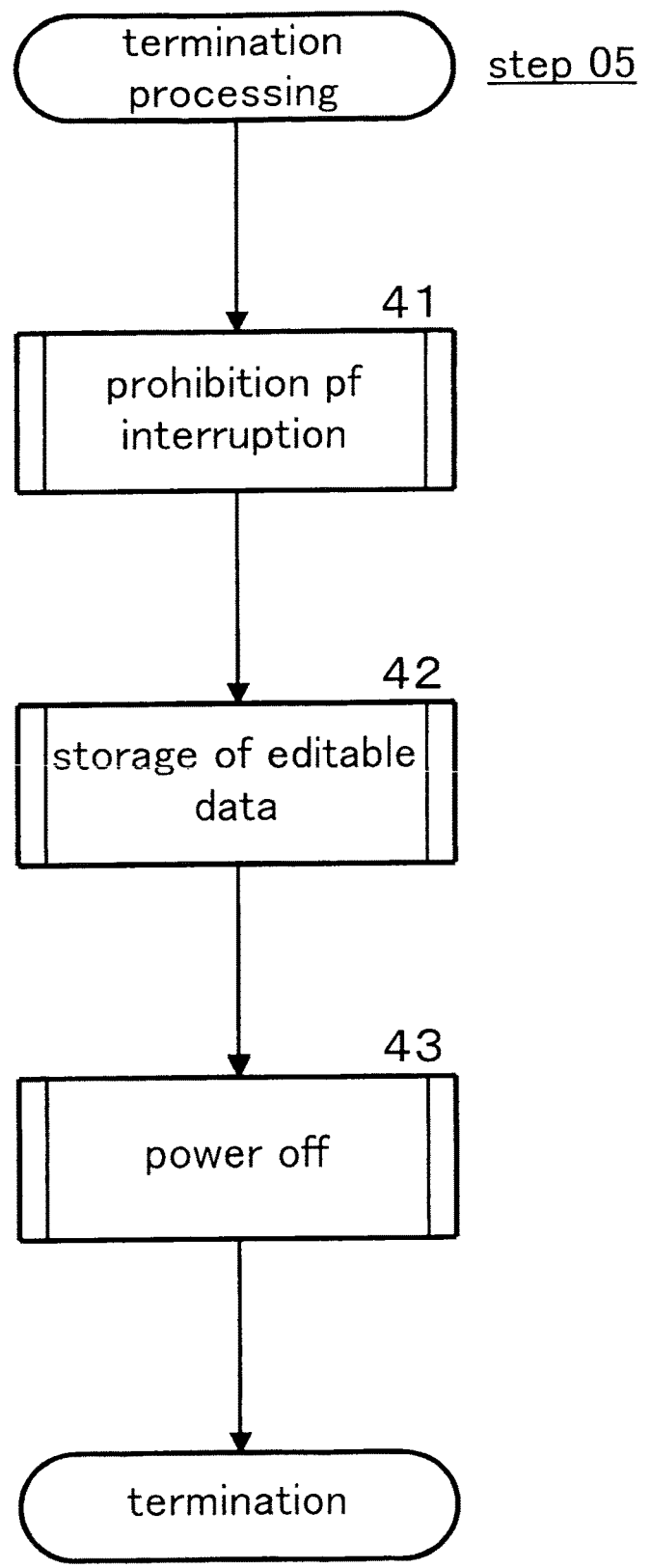
FIG. 7 shows a flowchart of the termination processing at step 05.

FIG. 7 shows a flowchart of termination processing in the step 05. The interruption is prohibited even if the timer instructs the interruption, or the external or cyclic interrupt signal TIN, OIN or SIN is sent (step 41). Thus the termination cannot be delayed as it is given a priority over the interruption.

Therefore if termination of the entire processing by the instruction processing apparatus is instructed before the time passes according to the waiting time information, the instruction corresponding to the waiting time information is not executed but the entire processing by the instruction processing apparatus is terminated.

Next if the program/data storage holds a rewritable memory (flash memory, RAM with a backup battery, etc.) which preserves memory during the power off time, editable data is copied (transcribed) from RAM to the aforesaid memory (step 42). If RAM which stores editable data preserves the data during the power off time, the copying is not necessary. Then the power circuit is instructed to turn off the power (step 43), and the processing is terminated.

(9) Event Processing Job

Figure 8:
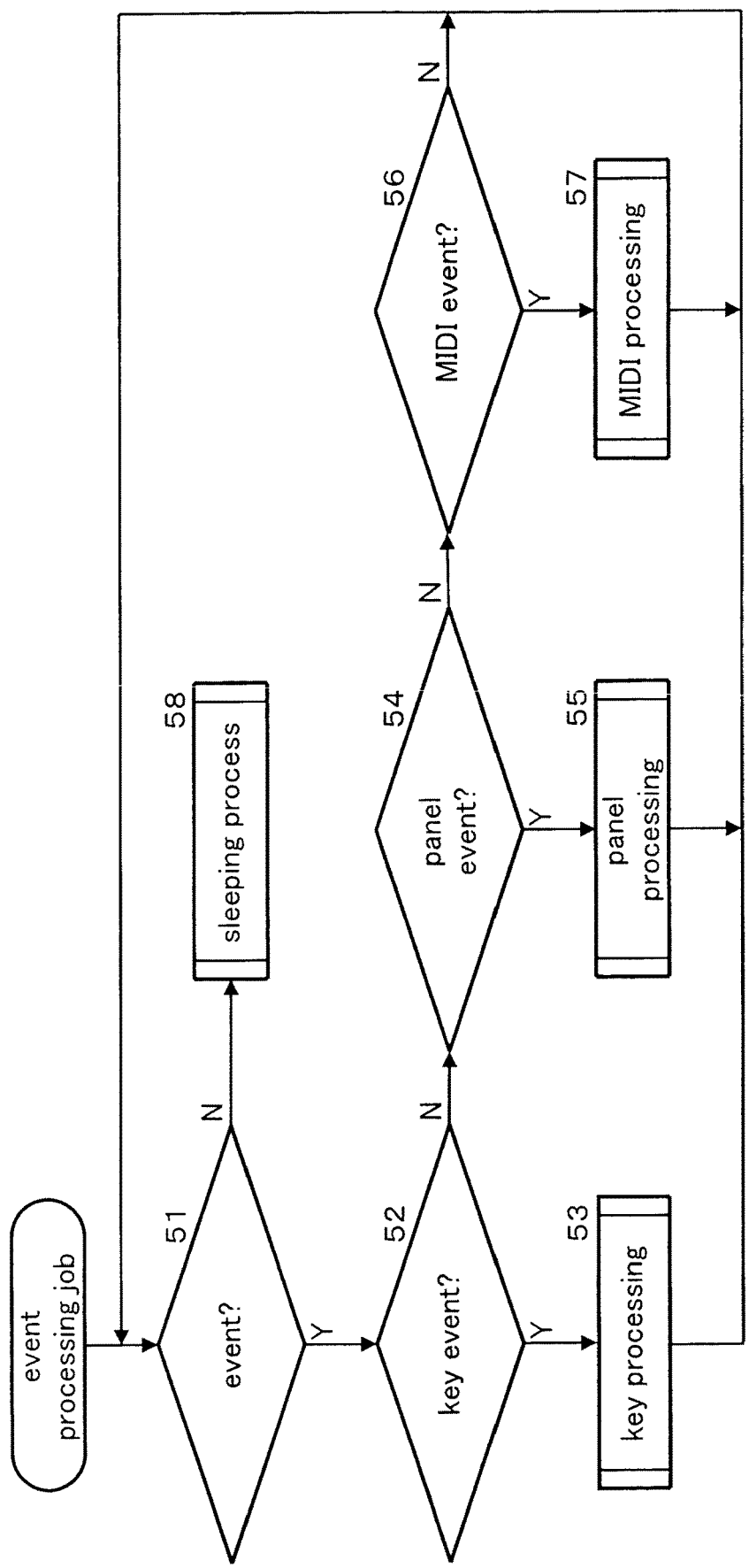
FIG. 8 shows a flowchart of the event processing job.
Figure 9:
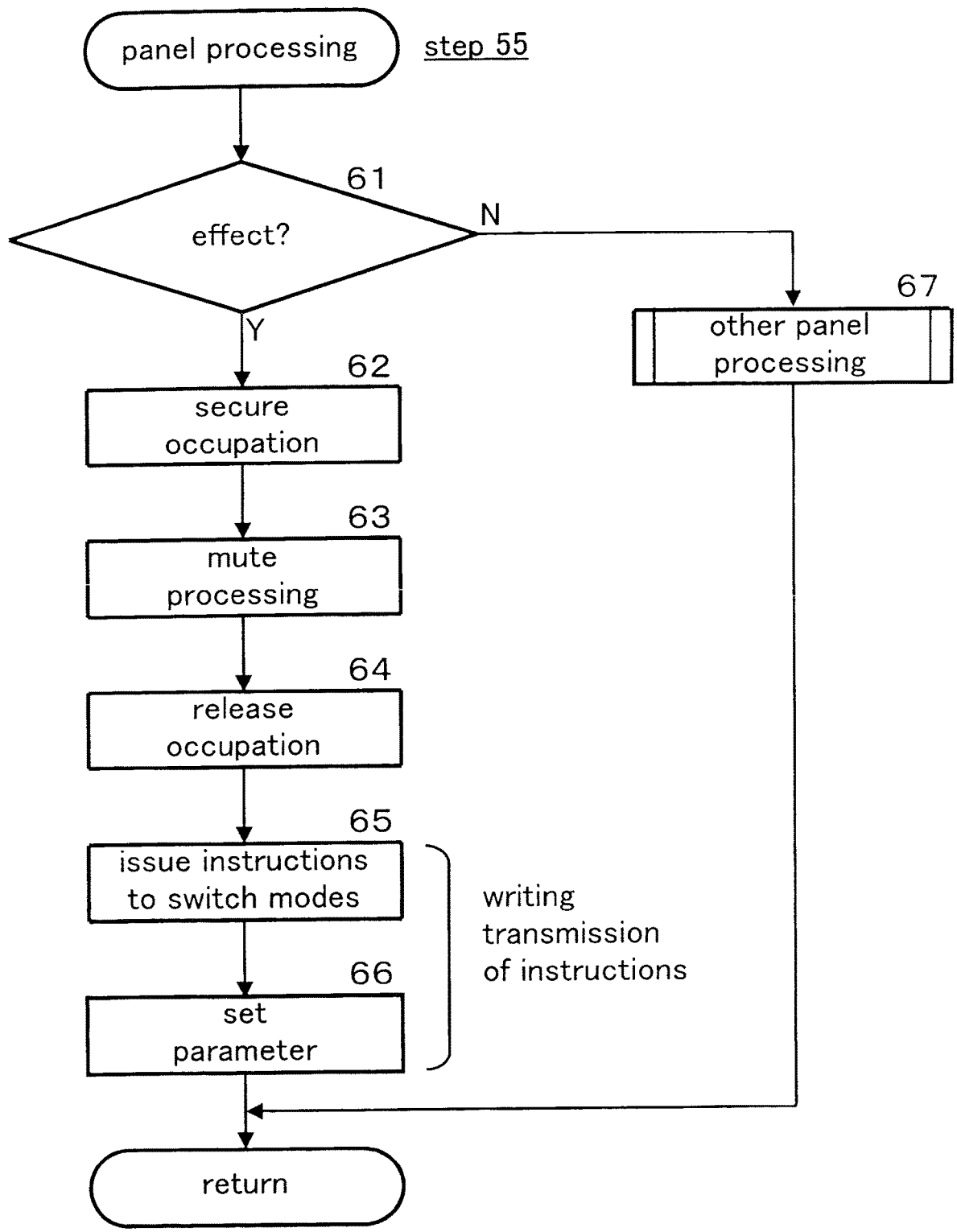
FIG. 9 shows a flowchart of the panel processing at step 55.

FIG. 8 shows an event processing job. This is one of the jobs processed in parallel by the controller 2 in the job processing (step 03). If an event of pressing or releasing a key occurs in the keyboard scan circuit 12, the external interruption and then the interruption event EV are caused. Accordingly the interruption processing (step 06) is executed so as to change the priority levels of the jobs. The highest priority level is given to the job to process the event of press or release of keys, and this job is executed (step 03).

Similarly when an event of timbre change or control change etc. occurs in the switch scan circuit 14, the job for the event is executed (step 03). When the MIDI circuit 15 has received a series of MIDI commands, the job for this command is executed (step 03). Lastly the execution of said job is resumed at the position next to where it was interrupted by the last timer or the external interruption. After the portion that has been left unprocessed is finished, the processing returns to the head (step 51).

At that time if there is an event that has been preserved, the event is executed. If not, the event that occurs last is executed (step 51). If the event is key-on or key-off (step 52), instructions are sent to the tone signal generator 5 and the external connect apparatus to start or end the tone generation with the tones corresponding to the pitches of the keys (step 53).

If the event is a panel event such as change of timbres or control (step 54), instructions are sent to the tone signal generator 5 and the external connect apparatus for those changes (step 55).

If the event is a MIDI event, the MIDI event is sent to the tone signal generator 5 (step 57). The MIDI event may be sent further to the external connect apparatus. If there are no events taking place to be handled (step 51), said job comes into a sleeping state (step 58).

In the sleeping state the priority level of said job becomes lowest. The priority levels of other jobs which are not in the sleeping state are raised by one level each, and the sleeping commands such as sleeping instructions and endless loops are executed. When an event occurs to return from the sleeping state, the return job is executed (step 06). The processing is resumed from the head of the job (step 51), not from the position next to where the processing was interrupted.

In the processing of the sleeping state, the external interruption takes place, and said job sleeps until said job is executed again after the interruption processing (step 06) and the job processing (step 03). Thus the execution of other jobs are given higher priority so that the controller 2 (CPU) is utilized efficiently.

The event processing job is written as an independent job, which can be called application, process or task, and is executed at the job processing step 03. The event processing may be a part of the single program working together with the operation shown in FIGS. 3 to 7.

(10) Panel Processing

FIG. 6 shows a flowchart of the panel processing at the step 55. If there is an event to switch, set or change the effect modes (step 61), DSP of the tone generator 5 is occupied for (dedicated to) the purpose (step 62).

The occupation (dedication) is secured as follows. First a code to identify the job is added to the program/data storage 4 at the end of the FIFO (first-in, first-out) memory disposed at every device (DSP). The FIFO is not illustrated in the figures. Next the priority level of the job is set at the second from the lowest. Then the head of the FIFO memory is checked (detected) and the processing is suspended until the identification cord of the job comes to the head.

When the cord to identify the job comes to the head, the priority of the job returns to the original level. Before the occupation is secured, other jobs are given higher priority to be executed. The job which is occupying the DSP is finished earlier and the occupation is released, and so the priority level of the job is lowered. In order to distinguish this state from the sleeping state, the priority level is set at the second from the lowest, not at the lowest. In the preferred embodiment described herein, it is not regarded as an event to secure the occupation (dedication). Therefore if the priority is set at the same level as the sleeping state, the execution of the job could be delayed. The alternative is to regard the occupation (dedication) securing as an event and give it the lowest priority level.

When a plurality of jobs are executed in parallel by the controller 2 (CPU), every job competitively secures and releases the occupation of the devices that are commonly used by the jobs. In the present invention the FIFO memory is disposed at the sound resource circuit of the tone signal generator 5, at the tone data table or/and the register memory table of the program/data storage 4 as well as at the DSP, and the secure and release of the occupation is similarly done for each of them. For the purpose of securing and releasing the occupation, other methods may be used than the usage of the FIFO memory as mention above.

The next process is to mute the sounding tones (step 63). This process is done by the tone signal generator 5 turning off the tones of the part for which the event has taken place gradually in a certain period of time such as in 100 micro seconds, and instructing the mute processing to DSP. When the turning off has been completed, no noise occurs if the effect modes are switched. It is not yet possible to switch the effect modes without noise right after this instruction has been issued, so that switching of the effect modes is not instructed to the DSP at this stage.

And the occupation of the DSP is released (step 64), which means that the FIFO memory is incremented. Then one column of the effect mode switching instructions is written at the instruction queue shown in FIG. 2 together with the waiting time of 100 micro seconds or the starting moment 100 micro seconds after the present time, and the interruption event EV occurs to switch the modes (step 65).

In order to set the initial parameter after switching the modes, one column of the effect parameter setting instructions is written at the instruction queue together with the zero waiting time. The zero waiting time may be the value of the waiting time/starting moment showing approximately the same appropriate value as the value until the present time to the waiting time, and accordingly the interruption event EV is generated to set the effect parameter (step 66). Each time one column is written in the aforesaid way, the address of the following column is set. At that time the effect mode switching instructions are sent outward.

Accordingly the effect mode switching instructions and the effect parameter setting instructions are written in the last column of the instruction queue shown in FIG. 2. For instance the effect mode switching instruction is as follows. The content of the instruction is 0xE003 (The first two digits are the code showing the effect modes switching. The last two digits show the part to be switched.). The instruction argument is 0x0003 (the effect mode number showing, for instance, an equalizer). The issue time is the value read from the timer 16 at the step 65 and the waiting time is 0x000A (=10, The value of 1 means 10 micro seconds.).

The effect parameter setting instruction is, for instance, as follows. The content of the instruction is 0xE103. (The first two digits is the cord showing the effect parameter setting. The last two digits show the part to be set, similarly to the part to be switched.) The instruction argument is 0x 1D3F. (The first two digits are a high-band gain and the last two digits are a low-band gain.) The issue time is the value read from the timer 16 at the step 65 similarly to the issue time of the effect mode switching instructions. The waiting time is 0x0000 (no waiting time).

When the starting moment is recorded in place of the waiting time, the waiting time of the effect mode switching instruction is the value added with 0x000A to the issue time. The waiting time of the effect parameter setting instruction can be any value from around the issue time to around the waiting time of the effect mode switching instruction. The program can be composed in such a way that the issue time can be picked up anywhere between the step 63 to the step 65.

Thus the effect mode switching instruction and the effect parameter having necessary waiting time are written in the instruction queue. Therefore the instructions fed from the panel switches can be sent to the jobs mentioned later, and the aforesaid two instructions are executed after a necessary waiting time in the order of having been written. The effect parameter is executed immediately after the execution of the effect mode switching instruction. It does not need a waiting time and the order of processing is the only to be determined.

Such an addition of the waiting time information is utilized for the effect mode switching instructions sent from outside through the MIDI circuit 15 as well as for the effect mode switching instructions fed from the panel switches 13. The above method may be used for the instructions fed from other panels and/or the MIDI circuit 15 and those fed from the keyboard 11 if the instructions are executed immediately after the instructions to be executed after a certain waiting time.

If the operation/event of the panel switches 13 is not to set or change the effects (step 61), the musical factor information corresponding to the operation/event is sent to the tone signal generator 5 or the sound system 6 and written in the program/data storage 4 or transmitted to the external connect apparatus (step 67). The steps 65 and 66 may be processed together.

(11) The Instruction Processing Job

Figure 10:
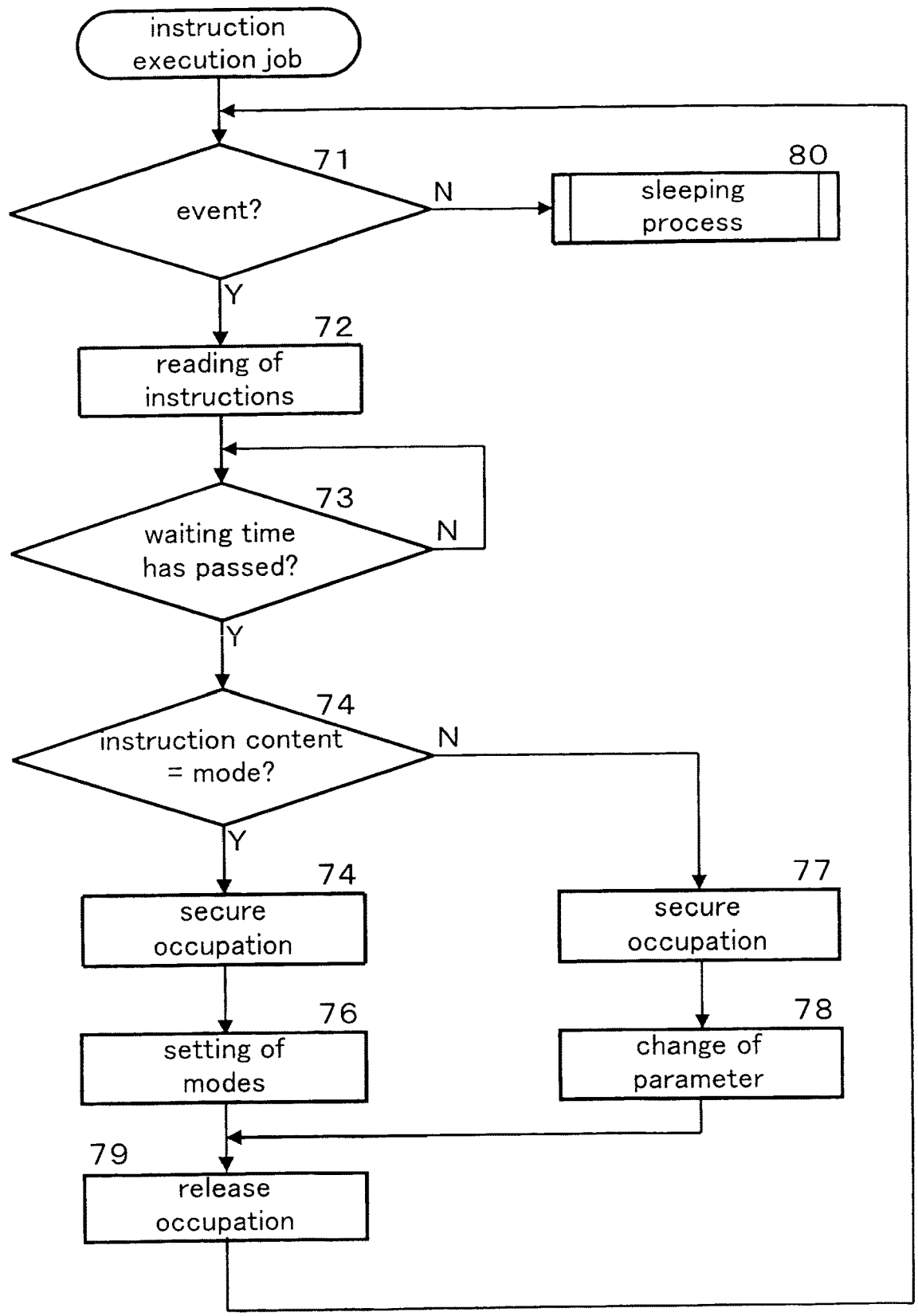
FIG. 10 shows a flowchart of the instruction execution job.

FIG. 10 shows a flowchart of the instruction execution job. The instruction execution job is one of the plural jobs executed in parallel by the controller 2 in the job processing step 03. If the event detection (step 51) finds no events to be processed after the effect mode switching event at the step 65 shown in FIG. 9, the jobs shown in FIG. 8 enter the sleeping state (step 58).

Then the cycle interrupt signal SIN generates a cycle interruption. When the processing returns to the position (A), the interruption detection (step 02) finds the interrupt event (the effect mode switching event) generated by the mode change instructions issued at the step 65. After the termination interruption is detected (step 04), the priority of said job is elevated at the interruption processing (step 06).

When the processing returns to the position (A), the event generated by the parameter setting (step 66) is detected. After the termination interruption detection (step 04), the priority level of the job is elevated again at the interruption processing (step 06). But this second change of the priority does not produce any further substantial processes, and the processing returns to the position (A). The above processes clear all the events to issue the mode switch instructions (step 65) and to set the parameter (step 66). Therefore if there are no other events taking place, after the interruption detection (step 02) the processing stage moves to the job processing (step 03) and said job comes to be handled.

If other events are taking place, after the processing of the events are finished the processing stage moves to the interruption detection (step 02) and then to the job processing (step 03) where said job is handled. The processing of said job is resumed from the step next to where it has been interrupted. After all the events under processing are completed, the processing returns to the top. If said job is sleeping, the processing is resumed from the top (step 71).

At this point new events occur as a result of issuing the mode switch instruction (step 65) and the parameter setting (step 66) (YES at the step 71). Accordingly one column of instructions is read from the instruction queue, and the value of adding the waiting time to the issue time or the value of the starting moment is stored (step 72). Then the present time is read from the timer 16 and is compared with the above stored value (step 73).

When the present time is earlier, the priority level of said job is moved to the second from the lowest. The process is repeated and the job is waiting until the present time becomes later than the value that has been stored as mentioned above. Meanwhile DSP performs the fade-out processing in the mute process (step 63). During the aforesaid repetition the priority level of said job is kept low so that the other jobs are given higher priority for processing.

Instead of waiting by comparison of the present time and the aforesaid stored value, the processing may be waited until the waiting time information in the instruction queue reaches zero as a result of being decremented at every time interrupt signal (for instance TIN) having a different cycle from the cycle interrupt signal SIN. When the starting moment information is used instead of the waiting time information, the starting moment information is similarly decremented at every timer interrupt signal (for instance TIN) having a different cycle from the cycle interrupt signal SIN, and the processing is waited until the starting moment information shows the starting moment becomes earlier than the instruction issue time.

Thus when the waiting time has passed or the starting moment has come (step 73), DSP of the tone signal generator 5 is occupied as in the step 62 (steps 74, 75 and 77), the effect modes are switched (step 76) or the effect parameter is set (step 78). As a result if the event is the effect mode switching, the effect modes are switched in an appropriate period of time (for instance 100 micro seconds) after the instruction of starting the fade-out to the DSP in the mute process (step 63).

On the other hand if the event is setting the effect parameter, the effect parameter setting is instructed to DSP of the tone signal generator 5 immediately after it is read out from the instruction queue since the waiting time or the starting moment is made the shortest. However as shown in FIG. 9, the effect parameter setting instruction is always written after the effect mode switching instruction, and therefore the effect modes are switched after a necessary waiting time after instructions are issued. Immediately after that the effect parameter is set. This is the right order for the processes to be executed.

For instance when the effect mode is switched to reverberation, the parameter includes the initial reflex time and the latter reverberation time. When the effect mode is switched to echo, the parameter includes the repeat time and the repeat rate. When the effect mode is switched to equalizer, the parameter includes a high-band gain and a low-band gain.

Next the occupation (dedication) of DSP in the tone signal generator 5 is released (step 79) similarly to the release of the occupation (dedication) in the step 64, and the processing returns to the step 71.

Taking the aforesaid example, the effect modes are switched after a certain fixed period of time (100 micro seconds) following the mute processing (step 63). It prevents noise from occurring though such noise could usually occur by switching the effect modes while DSP of the tone signal generator 5 is performing the fade-out. At the same time the effect parameter is set immediately after switching the modes to start or finish the vibrato processing. In this way instructions with or without (set to be the shortest) waiting time are executed one by one after a certain time passage according to the waiting time information.

If no events are taking place (step 71), said job enters the sleeping state (step 80) similarly to the step 58. The operations during the sleeping state and for returning from the sleeping state are the same as at the step 58 and as shown in FIG. 8. The sleeping process generates the instructions to execute said job. Said job is kept in the sleeping state until the job processing step 03 resumes to process the job. Accordingly other jobs are given priority to be processed, and the controller 2 is utilized effectively.

(12) Time Variable Job

FIG. 11 shows a flowchart of a time variable processing job. The time variable processing job is one of the jobs executed in parallel by the controller 2 in the job processing step 03. This job, unlike the jobs shown in FIGS. 8, 9 and 10, does not process events. Therefore this job is driven almost regularly in the job processing step 03 solely according the change of the priority levels made by the cycle interruption processing (FIG. 4) responsive to the cyclic interrupt signal SIN. This time variable is information/data/parameter, the control value/generation value of which are changed as time passes.

Firstly, time variable data such as a vibrato value is read (step 92) for each of the plural channels from No. 0 channel to, for instance, No. 96 channel (steps 91, 97). The occupation of the controller 2 is secured (step 93) similarly to the steps 62 and 74. Next the time variable data such as a vibrato value is changed as time passes (step 94) and the occupation of the controller 2 is released (step 95) similarly to the steps 64 and 78.

The steps from 91 through 97 are repeated for every channel. When all the channels have been handled, the processing is repeated from the first channel (step 97). The job processing step 0 works so as to have the time variable processing executed from the point next to where the processing has been finished the last time. When a certain period of time has passed for processing, the priority levels are changed by the cyclic interruption responsive to the cyclic interrupt signal SIN (FIG. 4) and accordingly the processing in interrupted. Then after other jobs are completed, the processing is resumed in the same manner as mentioned above after a certain period of time, and the same processes as mentioned above are repeated.

(13) Description of the Other Embodiments

The embodiment of the present invention is not limited to the above mentioned, but some modification is allowed so far as it does not deviate from the purpose of the present invention. For instance, the instructions processed by the instruction processing apparatus are those which require some waiting time, however, the instructions which do not require the waiting time may be included in some occasions.

In the aforesaid time variable job, there may be some external interruption events EV caused by a manual or automatic play, and the jobs according to the event data may be executed as an external interruption process in the aforesaid event processing job.

Here at the step 11, the event processing job is given the highest priority level, the priority levels of the other activated jobs are made one rank lower, and the interruption event EV is cleared. Then the processing returns to the position (A) between the steps 01 and 02. As the external interruption EV has been cleared, the step 02 gives a judgment of "No" and as a result the job whose priority level is raised is executed (step 03).

The other instructions which require some waiting time include, for instance, a key-on-delay taking some time from a parameter calculation to a sound start, a delay-vibrate taking some time from a key-on to a vibrate start and a gate process which turns sounds off automatically some time after a key-on.

The instructions processed by the instruction processing apparatus can be utilized for the instructions using DSP of the tone signal generator 5 such as chorus, auto panner, auto wow, phase shifter, flanger, distortion as well as the aforesaid reverb, echo and equalizer.

The instructions which do not use DSP of the tone signal generator 5, such as vibrato, portamento, glide, glissando, trill, tremolo, mandolin, pitch change, transpose, tune, envelope waveform change (level, speed or rate), touch sensitivity, initial/after touch as well as the instructions concerning the effect, may be written in the instruction queue together with the instructions using the DSP.

The present invention can be practiced for electric musical instruments and computers. The circuits shown in the aforesaid figures may be realized and functioned in software (flowchart), and the flowcharts in the aforesaid figures may be realized and functioned in a hardware (circuit). The inventions described in the claims can be realized as media to store a computer program in order to have a computer practice the present invention, an apparatus (method) to communicate a computer program, a tone generation apparatus (method) and a tone control apparatus.

In the present invention, the execution of each instruction includes the operating system. The processes from FIG. 3 to FIG. 11 including the figures after FIG. 8 can be united as one program. In such a case the aforesaid program can be worked as an application based on another operating system.

(14) The Other Effects of the Invention

1. A method of processing instructions on control means for executing of plural instructions and storage means for storing the plural instructions, wherein: step for adding a predetermined waiting time information to the first instruction and adding a shorter waiting time information to the instruction following the first instruction, upon receiving the instructions which are not provided with a waiting time until the execution of the instructions and are generated in order of execution, and storing the information in said storage means; and step for predetermining whether the waiting time has passed according to the time information and have said control means execute the instructions corresponding to the time information when the corresponding waiting time has passed.
2. A computer program for processing instructions on control means for executing of plural instructions and storage means for storing the plural instructions, wherein: processing for adding a predetermined waiting time information to the first instruction and adding a shorter waiting time information to the instruction following the first instruction, upon receiving the instructions which are not provided with a waiting time until the execution of the instructions and are generated in order of execution, and storing the information in said storage means; and processing for predetermining whether the waiting time has passed according to the time information and have said control means execute the instructions corresponding to the time information when the corresponding waiting time has passed.
3. A apparatus for processing instruction comprising: control means for executing of plural instructions; storage means for storing the plural instructions; add means for adding a predetermined waiting time information to the first instruction and adding a shorter waiting time information to the instruction following the first instruction, upon receiving the instructions which are not provided with a waiting time until the execution of the instructions and are generated in order of execution, and storing the information in said storage means; and predetermine means for predetermining whether the waiting time has passed according to the time information and have said control means execute the instructions corresponding to the time information when the corresponding waiting time has passed.
4. A apparatus for processing instruction comprising: control means for executing of plural instructions for the purpose of setting, changing or ending musical effects; storage means for storing the plural instructions; add means for adding instructions to keep tones turned off for a certain period of time to the plural instructions and add instructions to set or change musical effects with a shorter waiting time than the time for keeping tones turned off following these instructions and storing the instructions in said storage means; and predetermine means for predetermining whether the waiting time has passed according to the time information and have said control means execute the instructions corresponding to the time information when the corresponding waiting time has passed.

The instruction processing apparatus according to claim 3, wherein: the plural instructions are setting, changing or ending of musical effects and the first instruction is added (provided) with an instruction to turn sounds down for a predetermined (certain) period of time.

As a result it is made possible to get rid of an odd auditory sense which could be felt when musical effects are changed.

5. The apparatus for processing instruction according to claim 3 wherein: the plural instructions which are not provided with a waiting time until the execution of said instructions and are issued in an order of the execution, are information input by the means to input or change musical factors, MIDI standard information transmitted and received between electronic musical instruments or information input or changed by the apparatus to instruct starting or ending tone generation.

As a result a variety of instructions are able to be executed according to the time order without any change of the order to be executed.

6. The apparatus for processing instruction according to claim 4 wherein: the plural instructions which are not provided with a waiting time until the execution of said instructions and are issued in an order of the execution, are information input by the means to input or change musical factors, MIDI standard information transmitted and received between electronic musical instruments or information input or changed by the apparatus to instruct starting or ending tone generation.

As a result a variety of instructions are able to be executed according to the time order without any change of the order to be executed.

7. The apparatus for processing instruction according to claim 5 wherein: storing the priority levels of plural operations to be executed, changing the priority levels so as to higher the priority level of a new operation when an interruption by the new operation occurs and so as to lower the priority level of the operation when the operation is finished.

As a result the priority levels for the execution are able to be changed if the instructions are to be arranged according to the time order.

8. The apparatus for processing instruction according to claim 6 wherein: storing the priority levels of plural operations to be executed, changing the priority levels so as to higher the priority level of a new operation when an interruption by the new operation occurs and so as to lower the priority level of the operation when the operation is finished.

As a result the priority levels for the execution are able to be changed if the instructions are to be arranged according to the time order.

9. The apparatus for processing instruction according to claim 7 wherein: the priority levels are set low while waiting for the time to pass corresponding to said waiting time.

As a result the time order is not changed if the priority levels of the instructions are changed.

10. The apparatus for processing instruction according to claim 8 wherein: the priority levels are set low while waiting for the time to pass corresponding to said waiting time.

As a result the time order is not changed if the priority levels of the instructions are changed.

11. The apparatus for processing instruction according to claim 9 wherein: the changing the priority levels is not executed for the time to pass corresponding to said waiting time.

As a result the time order is not changed if the priority levels of the instructions are changed.

12. The apparatus for processing instruction according to claim 10 wherein: the changing the priority levels is not executed for the time to pass corresponding to said waiting time.

As a result the time order is not changed if the priority levels of the instructions are changed.

13. The apparatus for processing instruction according to claim 5 wherein: the entire apparatus for processing instruction stops without executing the instructions corresponding to the waiting time information if an instruction is issued to stop the entire apparatus for processing instruction when time has passed according to said waiting time.

As a result the instruction for the termination is given priority on the other instructions.

14. The apparatus for processing instruction according to claim 6 wherein: the entire apparatus for processing instruction stops without executing the instructions corresponding to the waiting time information if an instruction is issued to stop the entire apparatus for processing instruction when time has passed according to said waiting time.

As a result the instruction for the termination is given priority on the other instructions.

15. The apparatus for processing instruction according to claim 7 wherein: the entire apparatus for processing instruction stops without executing the instructions corresponding to the waiting time information if an instruction is issued to stop the entire apparatus for processing instruction when time has passed according to said waiting time.

As a result the instruction for the termination is given priority on the other instructions.

16. The apparatus for processing instruction according to claim 8 wherein: the entire apparatus for processing instruction stops without executing the instructions corresponding to the waiting time information if an instruction is issued to stop the entire apparatus for processing instruction when time has passed according to said waiting time.

As a result the instruction for the termination is given priority on the other instructions.

17. The apparatus for processing instruction according to claim 15 wherein: the priority level of the operation which has just been executed lastly is lower and the priority level of the other operation is higher by cyclic interruption processing, therefore the priority levels are changed by cyclic interruption processing.

As a result a cyclic changing of the priority level is executed without exception.

18. The apparatus for processing instruction according to claim 16 wherein: the priority level of the operation which has just been executed lastly is lower and the priority level of the other operation is higher by cyclic interruption processing, therefore the priority levels are changed by cyclic interruption processing.

As a result a cyclic changing of the priority level is executed without exception.

19. The apparatus for processing instruction according to claim 17 wherein: the priority level of an operation which is in the sleeping state is not changed.

As a result the priority level of the operation which is in the sleeping state is not changed. Therefore the execution of other jobs which are not in the sleeping state are given higher priority so that the controller (CPU) is utilized efficiently.

20. The apparatus for processing instruction according to claim 18 wherein: the priority level of an operation which is in the sleeping state is not changed.

As a result the priority level of the operation which is in the sleeping state is not changed. Therefore the execution of other jobs which are not in the sleeping state are given higher priority so that the controller (CPU) is utilized efficiently.

What is claimed is:

1. A method of processing a plurality of instructions, including a first instruction and a second instruction,
receiving the first instruction without a first waiting time and subsequently assigning the first instruction with an issue time, and receiving the second instruction without a second waiting time and subsequently assigning the second instruction with the issue time;
providing to the first instruction, by a controller, a first waiting time information after the first instruction is received;
providing to the second instruction, by the controller, a second waiting time information after the second instruction is received, the second waiting time of the second waiting time information is shorter than the first waiting time of the first waiting time information;
storing the first instruction and the second instruction;
determining whether the first waiting time of the first waiting time information and the second waiting time of the second waiting time information passed, the first waiting time of the first waiting time information and the second waiting time of the second waiting time information beginning at the issue time;
executing the first instruction when the first waiting time of the first waiting time information passes; and executing the second instruction when a summation of the second waiting time of the second waiting time information and the first waiting time of the first waiting time information passes.

2. A non-transitory computer readable medium storing a program causing a computer to execute a process for processing a plurality of instructions including a first instruction and a second instruction, the process comprising:
receiving the first instruction without a first waiting time and subsequently assigned the first instruction with an issue time, and receiving the second instruction without a second waiting time and subsequently assigned the second instruction with the issue time;
providing to the first instruction, by a controller, a first waiting time information after the first instruction is received;
providing to the second instruction, by the controller, a second waiting time information after the second instruction is received, the second waiting time of the second waiting time information is shorter than the first waiting time of the first waiting time information;
storing the first instruction and the second instruction;
determining whether the first waiting time of the first waiting time information and the second waiting time of the second waiting time information passed, the first waiting time of the first waiting time information and the second waiting time of the second waiting time information beginning at the issue time;
executing the first instruction when the waiting time of the first waiting time information passes; and
executing the second instruction when a summation of the second waiting time of the second waiting time information and the first waiting time of the first waiting time information passes.

3. An apparatus for processing a plurality of instructions including a first instruction and a second instruction, the apparatus comprising:
a receiving device that receives the first instruction without a first waiting time and subsequently assigning the first instruction with an issue time;
the receiving device receives the second instruction without a second waiting time and subsequently assigning the second instruction with the issue time;
an execution device that receives a first waiting time information that corresponds to the first instruction after the first instruction is received;
the execution device receives a second waiting time information that corresponds to the second instruction after the second instruction is received, the second waiting time of the second waiting time information is shorter than the first waiting time of the first waiting time information;
a storage device that stores the first instruction and the second instruction;
a determination device that is configured to determine whether the first waiting time of the first waiting time information and the second waiting time of the second waiting time information passed, the first waiting time of the first waiting time information and the second waiting time of the second waiting time information beginning at the issue time; and
the execution device executes the first instruction when the first waiting time of the first waiting time information passes and executes the second instruction when a summation of the second waiting time of the second waiting time information and the first waiting time of the first waiting time information passes.

4. An apparatus for processing a plurality of instructions that set, change or end musical effects, the apparatus comprising:
a control device that is configured to execute the plurality of instructions that set, change or end musical effects;
a storage device that stores the plurality of instructions;
the control device is configured to receive a first instruction for keeping at least one tone turned off with a first time period, the first instruction having an issue time;
the control device is configured to receive a second instruction for setting or changing musical effects with a second time period that is shorter than the first time period following the first instruction, the second instruction having the issue time, the first and second instructions are stored in the storage device; and
a determination device that is configured to determine whether the first time period and the second time period passed, the first period of time and the second period of time beginning at the issue time, wherein
the control device is configured to further execute the first instruction when the first time period passes, and execute the second instruction when a summation of the first time period and the second time period passes.

5. The apparatus for processing the plurality of instructions according to claim 3, wherein:
the second instruction includes information to input or change musical factors, MIDI standard information transmitted and received between electronic musical instruments or information input or changed by the apparatus to instruct starting or ending tone generation.

6. The apparatus for processing the plurality of instructions according to claim 4, wherein:
the second instruction includes information to input or change musical factors, MIDI standard information transmitted and received between electronic musical instruments or information input or changed by the apparatus to instruct starting or ending tone generation.

7. The apparatus for processing the plurality of instructions according to claim 5, wherein:
the storage device is configured to store the plurality of instructions to be executed, and
the execution device is configured to change priority levels of the plurality of instructions so as to assign a higher priority level to a new instruction when an interruption by the new instruction occurs and so as to assign a lower priority level to the new instruction when a new operation is finished.

8. The apparatus for processing the plurality of instructions according to claim 6, wherein:
the control device is configured to change priority levels of the plurality of instructions so as to assign a higher priority level to a new instruction when an interruption by the new instruction occurs and so as to assign a lower priority level to the new instruction when a new operation is finished.

9. The apparatus for processing the plurality of instructions according to claim 7 wherein:
the priority levels are low while waiting for the first waiting time information and the second waiting time information to pass.

10. The apparatus for processing the plurality of instructions according to claim 8, wherein:
the priority levels are low while waiting for the first time period and the second time period to pass.

11. The apparatus for processing the plurality of instructions according to claim 9, wherein:

the change of the priority levels is not executed during the waiting for the first waiting time information and the second waiting time information to pass.

12. The apparatus for processing the plurality of instructions according to claim 10, wherein:
the change of the priority levels is not executed during the waiting for the first time period and the second time period to pass.

13. The apparatus for processing the plurality of instructions according to claim 5, wherein:
the apparatus stops without executing the instructions if an instruction is issued to stop the apparatus.

14. The apparatus for processing the plurality of instructions according to claim 6, wherein:
the apparatus stops without executing the instructions if an instruction is issued to stop the apparatus.

15. The apparatus for processing the plurality of instructions according to claim 7, wherein:
the apparatus stops without executing the instructions if an instruction is issued to stop the apparatus.

16. The apparatus for processing the plurality of instructions according to claim 8, wherein:
the apparatus stops without executing the instructions if an instruction is issued to stop the apparatus.

17. The apparatus for processing the plurality of instructions according to claim 15, wherein:
the priority level of the instruction, which is executed last, is lower and the priority level of an other instruction is higher by cyclic interruption processing, the priority levels are changed by cyclic interruption processing.

18. The apparatus for processing the plurality of instructions according to claim 16, wherein:
the priority level of the instruction, which is executed last, is lower and the priority level of an other operation is higher by cyclic interruption processing, the priority levels are changed by cyclic interruption processing.

19. The apparatus for processing the plurality of instructions according to claim 17, wherein:
the priority level of an operation which is in a sleeping state is not changed.

20. The apparatus for processing the plurality of instructions according to claim 18, wherein:
the priority level of an operation which is in a sleeping state is not changed.

21. The apparatus for processing the plurality of instructions according to claim 3, wherein the second waiting time is 100 micro seconds.

* * * * *